United States Patent [19]

Renk et al.

[11] 4,347,759

[45] Sep. 7, 1982

[54] GEAR CASE

[76] Inventors: Richard J. Renk, 768 Terrace La.;
George E. Boller, 1312 Randall St.,
both of Winona, Minn. 55987

[21] Appl. No.: 71,193

[22] Filed: Aug. 30, 1979

[51] Int. Cl.³ .............................................. F16H 57/02
[52] U.S. Cl. ..................................... 74/606 R; 74/467
[58] Field of Search .................... 74/606 R, 608, 609,
74/467; 64/3, 4; 277/220, 68, 182, 184, 152, 67,
11, 29; 308/36.1

[56] References Cited

U.S. PATENT DOCUMENTS

| | | | |
|---|---|---|---|
| 2,438,020 | 3/1948 | Rambo et al. | 74/606 |
| 2,517,913 | 8/1950 | Nickle | 74/606 |
| 2,868,574 | 1/1959 | Rich, Jr. | 308/36.1 UX |
| 3,099,454 | 7/1963 | Walinski | 277/152 X |
| 3,106,405 | 10/1963 | Pringle | 277/184 X |
| 3,167,969 | 2/1965 | Dilworth et al. | 74/467 |
| 3,254,925 | 6/1966 | Cox | 308/36.1 |
| 3,276,289 | 10/1966 | Cox | 74/606 |
| 3,281,190 | 10/1966 | Cox | 308/36.1 |
| 3,370,857 | 2/1968 | Roman | 277/68 X |
| 3,433,541 | 3/1969 | Dradik | 308/36.1 |
| 3,710,646 | 1/1973 | Bogan | 74/609 |
| 3,746,351 | 7/1973 | Tucker, Jr. | 277/184 X |
| 4,025,079 | 5/1977 | Renk et al. | 277/220 |

FOREIGN PATENT DOCUMENTS 653829  12/1962  Canada .................................. 277/29

*Primary Examiner*—Kenneth Dorner

[57] ABSTRACT

A lubricant retaining device for use with a gear case having a pair of matable sections with a shaft receiving opening therein. The lubricant retaining device extends inwardly to the interior of said case to reduce lubricant flow through said shaft receiving opening.

12 Claims, 12 Drawing Figures

4,347,759

1

GEAR CASE

BACKGROUND OF INVENTION

The present invention relates to the retaining of lubricant in gear cases or casings and more particularly to the retaining of lubricant in traction motor gear cases such as found in diesel and electric locomotives and generally shown in U.S. Pat. No. 3,710,646.

Gear cases of this type include a pair of matable sections which can be nested about the pinion, bull gear, axle and shafts associated with the driving of locomotive wheels to provide an enclosure for the retention of lubricant.

Because of the critical nature of the gear case, it is important to retain the lubricant in the case and keep dirt, brake shoe dust, water and other contaminants out. However, up to this time, it has been difficult to retain lubricants because of the many variables involved such as the lateral movement of the locomotive axle relative to the traction motor and gear case attached thereto, because extreme vibration transmitted through the wheels and axles, and because of the characteristics of the lubricants necessary for proper lubrication of the gears (which often times include chunks of polyethylene bag materials and the like).

SUMMARY OF INVENTION

The present invention provides an arrangement wherein lubricant is restricted in its flow outwardly of the gear case. This is accomplished by the use of a device which extends inwardly from a side(s) of the gear case shielding relation between a gear and a shaft surface in the case. The device restricts the flow of lubricant toward the shaft while at the same time is not susceptible to plugging so as to become inoperable because of additives and foreign matter in the lubricant.

PREFERRED EMBODIMENTS

Figure 1:
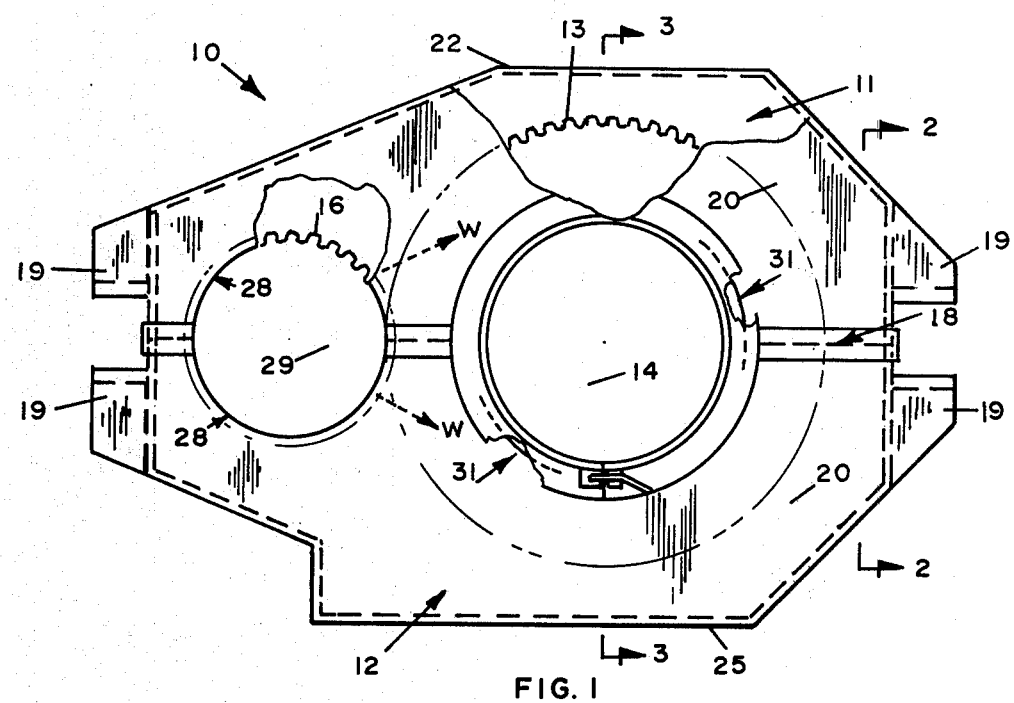
FIG. 1 is a side elevation of gear case with the concepts of the invention included therein.

In the drawings, the invention will be described with specific reference to locomotive traction motor gear case but it is of course not limited thereto.

Figure 2:
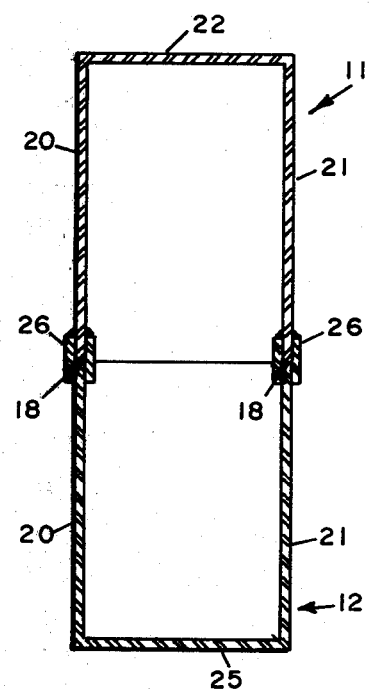
FIG. 2 is a sectional view of the gear case along lines 2—2 of FIG. 1 showing how a tongue and groove arrangement is used along the mating split-line of the respective halves of the gear case.
Figure 3:
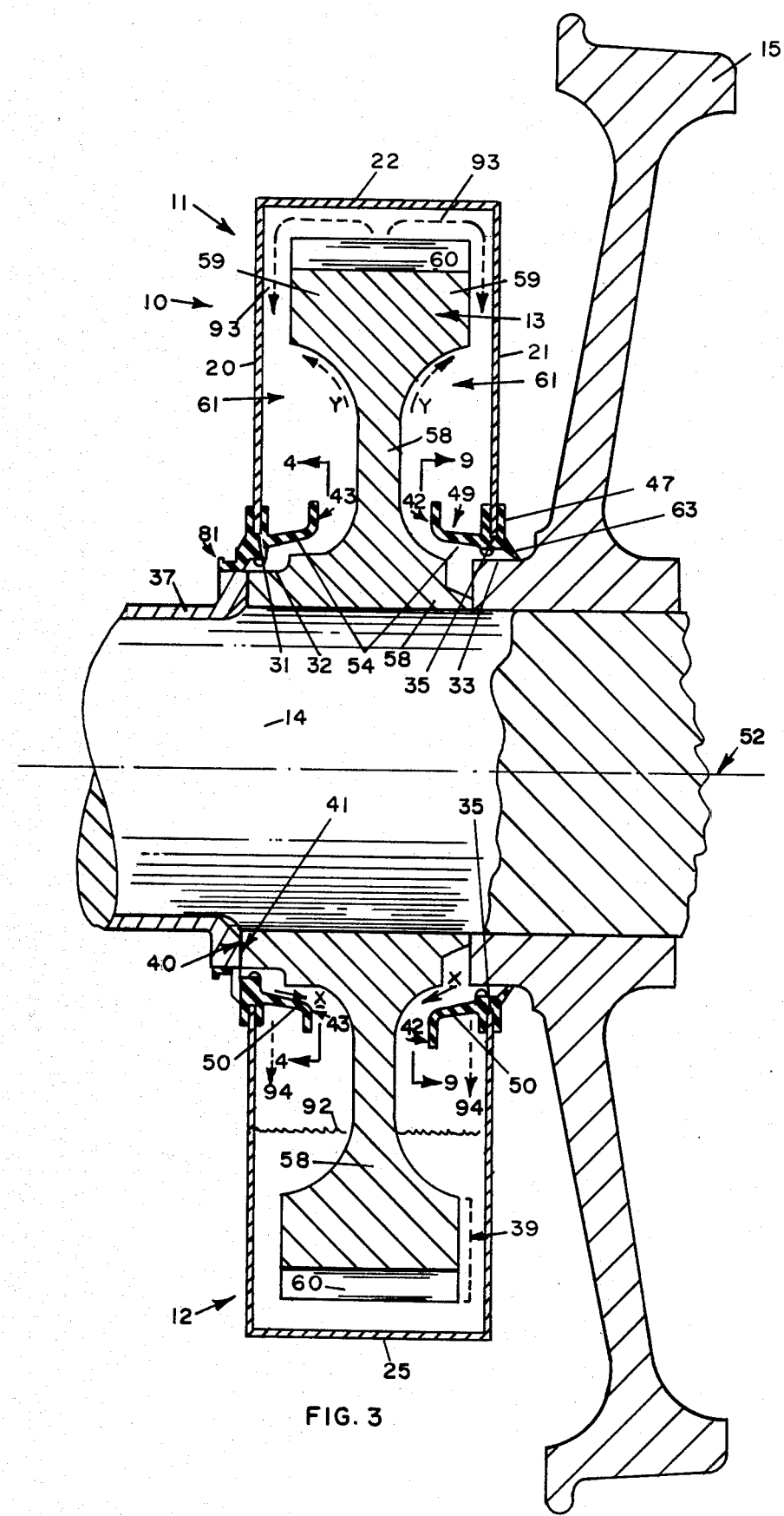
FIG. 3 is a vertical sectional view of the gear case relative to a locomotive axle, wheel, bull gear, and traction motor support bearing taken generally along lines 3—3 of FIG. 1.

As shown in FIGS. 1–3, a typical gear case 10 comprises a pair of matable sections including an upper or top section 11 and a lower or bottom section 12 which encase movable parts such as a conventional bull gear 13 (carried by an axle 14) and driving pinion gear 16 (FIG. 1). The gears and axle in turn drive wheel(s) 15 (FIG. 3).

The sections 11 and 12 are somewhat similar in shape and mate at a split-line indicated at 18 (FIG. 2) to provide a unitary structure. Brackets 19 at their ends are used to clamp the sections 11 and 12 mating relationship to supporting arms of a traction motor (not shown). As shown in FIG. 2, the upper gear case section 11 includes sides 20 and 21 and a top wall 22 having a series of angularly disposed areas. The lower section has somewhat similar sides 20 and 21 and a bottom 25 with several angularly disposed areas.

The gear case sections 11 and 12 are kept in alignment with respect to one another along the split-line 18 by metal strips 26 welded along the top sides 20 and 21 adjacent the split-line to provide a groove. The strips 26 overhang the split-line 18 and help provide a tongue groove area into which the split-line edge of the lower section 12 nests.

The gear case side wall 20 is provided with a semicircular cutout 28 or recess in both the top 11 and bottom 12 which align with one another to provide a circular passage to the inside of the case through which a traction motor pinion drive shaft 29 may pass. The gear case sidewall 20 also has two larger semicircular cutouts or recesses 31 in the top and bottom halves 11 and 12 which align with one another to provide a circular passage through which a rotating shaft surface such as a gear hub 32 (FIG. 3) (to be discussed later) may pass.

On the opposite or wheel side of the gear case (FIG. 3), there is generally only one circular cutout or passage 35 provided; this is formed by two semicircular cutouts or recesses in the respective halves 11 and 12. The passage 35 allows a shaft surface such as a wheel hub 33 (to be discussed later) to extend into the interior of the case.

The various circular cutouts or passages provide communication between the inside and the outside of the case through which movable members such as those having shaft-like surfaces or areas may extend such as the gear hub 32 and the wheel hub 33. It is through these passages that lubricant may leak from the case and/or dirt and water may enter the case.

Detailed reference is now made to FIG. 3 which shows a cross section through the gear case showing its relationship to the locomotive bull gear 13, axle 14, wheel 15, and traction motor suspension bearing 37. The gear 13 and wheel 15 are secured to the axle 14.

The traction motor (not shown) drives the pinion gear 16 which in turn drives the bull gear 13 and consequently the axle 14 wheels 15. The axle rotates in the suspension bearing 37 which is statically retained by the traction motor; the gear case 10 is bolted to the traction motor through the brackets 19 (FIG. 1). In practice, the traction motor is designed to allow for lateral or axial movement between the axle 14 and the suspension bearings 37.

Since the gear case 10 is fixed with respect to the traction motor and the suspension bearing 37, the bull gear 13 may move laterally to the position indicated by the dotted line 39 (FIG. 3, bottom half). This lateral movement may be between 1/16" and 5/16". The same movement will also appear between the flange 40 of the suspension bearing 37 and the gear hub thrust face 41.

It is this lateral movement between the gear case 10 and the rotating gear 13 (carried by the axle) which has made it extremely difficult to keep lubricants in the gear case because of the pumping action and alternate lateral pressures on the gear lubricants within the case. In service, even under reasonable speeds, the lateral oscillations can be 30 to 90 cycles per minute. With a locomotive traveling 12,000 to 20,000 miles per month, the lubricant losses can be quite high and require numerous time consuming and costly refilling stops.

Figure 6:
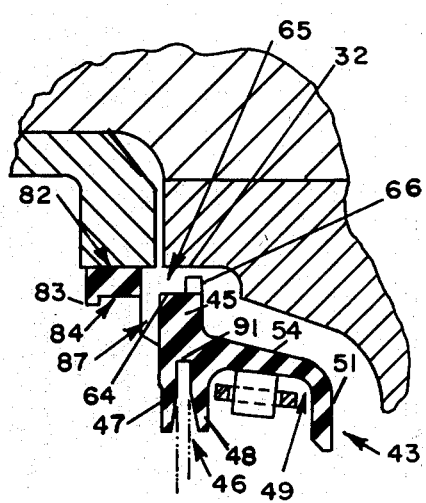
FIG. 6 is a view of the lubricant retaining device taken along its split-line at the 6:00 o'clock position thereof along lines 6—6 of FIG. 4 and through a latch for bringing the split ends of the device together.
Figure 7:
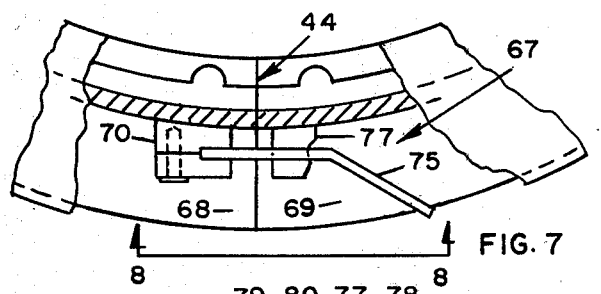
FIG. 7 is an enlarged side elevation of the latch shown in the cutaway section of FIG. 4.
Figure 8:
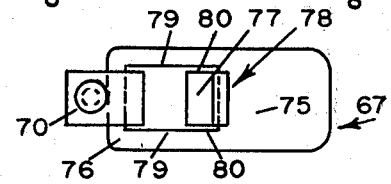
FIG. 8 is a plan view of the latch as viewed along lines 8—8 of FIG. 7.

Now, in accordance with the present invention, to reduce lubricant losses from the gear case (and prevent water and dirt entry into the gear case) there are provided sealing means or lubricant retaining devices 42 on the wheel side and 43 on the motor side. As shown in FIGS. 3-11, the sealing elements 42 and 43, which may be molded from a resilient material, such an elastomeric material, may be circular or annular in shape and formed as one piece with a split-line 44 (FIG. 7).

Generally, the sealing elements 42 and 43 have a circumferentially or arcuately extending base 45 (FIG. 6) with a circumferentially extending slot 46 opening radially outwardly from the base and defined between circumferentially extending outer legs 47 and inner legs 48. The slot 46 in the respective sealing elements or members is made to receive the cutouts 31 and 35 of the gear case sides in tongue and groove fashion as will be described in detail later.

Extending inwardly from the sealing element base 45 toward the inside of the gear case is an arcuately or circumferentially oriented section in the nature of a trough or channel 49. The trough 49 is formed by the inner leg 48, a web 50, and a flange 51. The flange 51 extends somewhat vertically or perpendicular to the axial centerline or axis of rotation 52 and radially outwardly therefrom.

Figure 5:
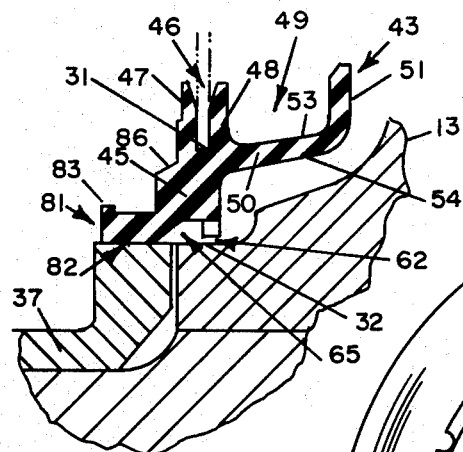
FIG. 5 is a sectional view of the motor side lubricant retaining device taken along lines 5—5 of FIG. 4 generally at the 12:00 o'clock position of the device.
Figure 4:
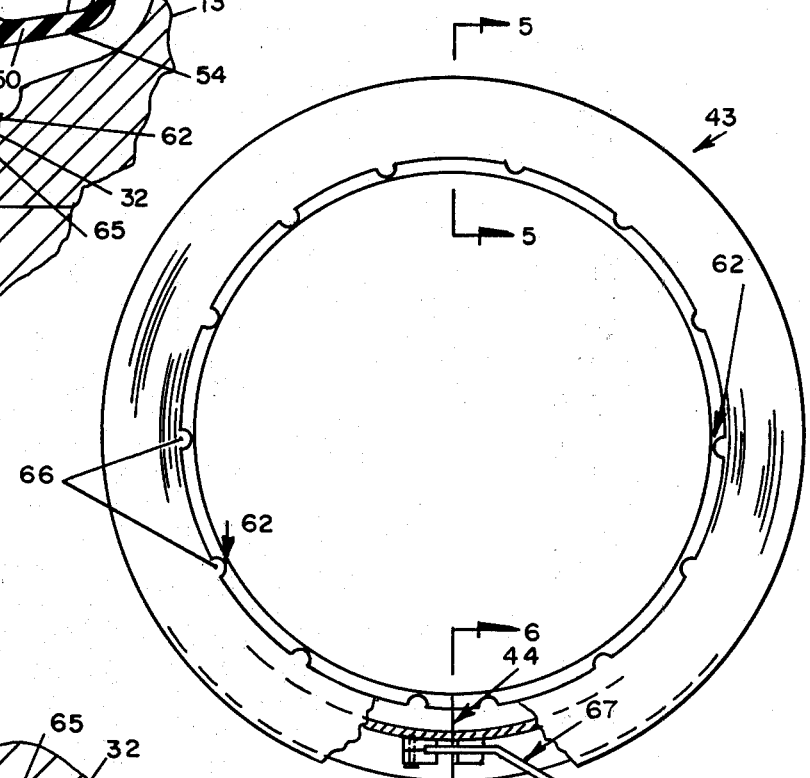
FIG. 4 is a side elevation of the motor or inboard side lubricant retaining device as viewed along lines 4—4 of FIG. 3.
Figure 10:
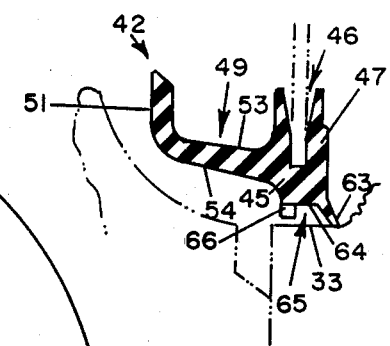
FIG. 10 is a sectional view of the lubricant retaining device taken generally along lines 10—10 of FIG. 9 at approximately the 12:00 o'clock position thereof.
Figure 12:
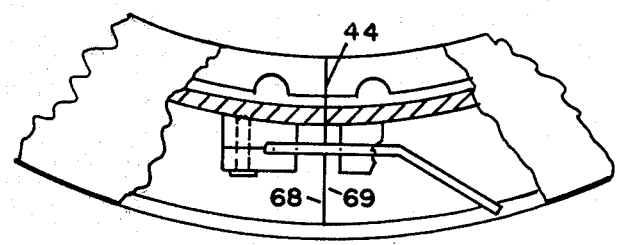
FIG. 12 is an enlarged side elevation of the latch shown in the cutaway section of FIG. 9.
Figure 11:
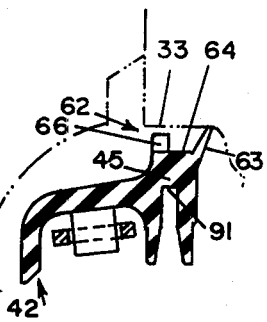
FIG. 11 is a sectional view taken along line 11—11 of FIG. 9 along the split-line of the wheel side lubricant retaining device, and the latch therefor at approximately the 6:00 o'clock position thereof.

As shown in FIGS. 3, 5, and 10, the web 50 extends in a generally axial direction and has an outer wall 53 forming the bottom of the trough area. An inner wall 54 faces toward the axial centerline 52 and diverges radially away therefrom as the web extends inwardly into the case and away from the base 45 and gear case sides 20, 21 etc. In other words, the I. D. or inner wall 54 of the web has a somewhat frustroconical shape, spreading wider or enlarging as it progresses away from the gear case sides.

For purposes of the invention, the trough 49 faces or opens radially outwardly from the horizontally disposed axial centerline 52, i.e. facing toward the top and bottom walls 22 and 25 of the gear case. The trough 49 extends inwardly from the sides of the gear case toward the gear arm or web 58 which is relatively thinner than the gear rim 59 having teeth 60.

As such, the gear rim 59, located radially outwardly from the arm 58, overhangs the arm and the trough flange 51. In other words, the flange 51 extend inwardly under the projection of the sides of the rim to the undercut area 61 for a purpose to be described later. The gear arm or web 58, of course, may be solid or spoked.

Specific reference is now made to the wheel-side sealing device 42 (FIG. 3). For purposes of sealing against the cylindrical wheel hub surface 33, there is provided a lip 63 extending radially inwardly and angularly outwardly from the base 45 and away from the outer leg 47. Lip 63 is formed to have a slightly smaller diameter than the wheel hub surface 33 so as to compressively engage and seal thereagainst.

As may be seen in FIGS. 3 and 10, the wheel hub surface 33 is cylindrical or shaft-like and extends through the sealing member 42 and into the interior of the gear case. To permit entry into the case, (or in other words to allow the gear case sides 21 to overhang the hub surface), the sealing element base 45 has its lower inner circumferential surface 64 spaced from the hub surface 33 as indicated at 65. That is, the surface 64 has a larger I.D. than the wheel hub 33.

Figure 9:
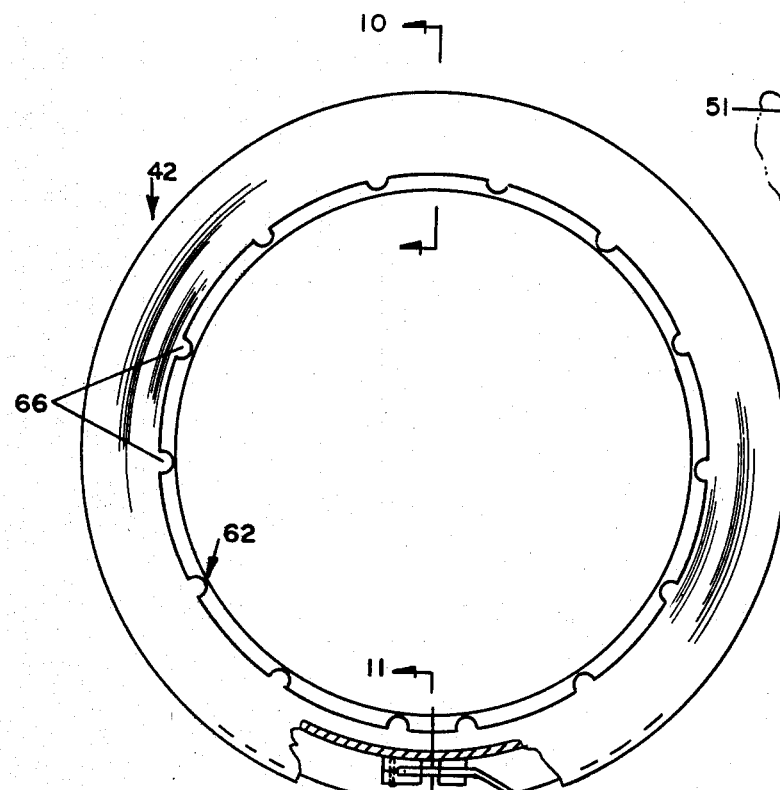
FIG. 9 is a side elevation of the wheel or outboard side retaining device as viewed along lines 9—9 of FIG. 3.

To keep the base surface 64 away from the wheel hub 33, and particularly during insertion of the gear case sides 20 and 21 into the sealing element slot 46, there are provided spacer means in the form of projections or protrusions 66 which extend radially inwardly from the base surface 64 toward the hub. As shown in FIG. 9, the projections are spaced apart circumferentially and may take the shape of small semicircles to provide minimal contact should any of them touch the hub surfaces 33 (or 32). Normally, it is desirable to have the projections spaced from the hub surfaces 32 and 33 as shown at 62 in FIGS. 9 and 11 and somewhat in line with the slot 46.

As will be described in greater detail later, if the gear case side sheets 20 and 21 meet any resistance when being nested in the slots 46, the sealing device may be deflected toward the hub slightly and the projections 66 will tangentially bottom or contact the hub thereby stopping the bending and providing a firm base to force the sealing element into full nesting engagement between the slots 46 with the side sheets 20 and 21. At the same time, the projections will keep the bottom 64 of the sealing device base spaced substantially as shown at 65.

For purposes of installing a sealing element or member 42 or 43, there is provided a latch 67 (FIGS. 4, 7 and 8) which holds the split ends 68 and 69 of the sealing elements together along the split-line 44. The latch includes a hinge boss 70 secured to the trough outer wall 53 on the split end 68. A clasp 75 is pivotally mounted by its leg 76 to the boss 70. On the opposite split end 69, there is mounted a catch or lug 77, the latter also being secured to the trough outer wall 53.

To pull the split ends 68 and 69 together, the clasp 75 has a slot 78 therein which is adapted to slide over the lug 77 and pull the respective ends together. The clasp also serves to keep the split ends in lateral alignment with one another as the slot side edges 79 are only slightly wider than the side edges 80 of the lug 77 to reduce lateral movement between the ends. Installation of the gear case relative to the sealing elements will be discussed later.

Reference is now made to the motor side sealing element 43 (FIGS. 4-8) which differs generally from the wheel side sealing element 42 by the use of a sealing collar 81 to seal against the support bearing static flange rim 82 instead of a hub sealing lip 63. Other parts similar to the wheel side sealing element 42 are designated by like numerals.

The sealing collar 81 extends axially outwardly of the sealing element outer leg 47 to the outside of the gear case and is offset or displaced slightly radially downwardly from the base 45 toward the axial centerline 52. Along its outer edge, the collar 81 has a ridge 83 projecting radially outwardly to form a recess 84 (FIG. 6) into which a steel band (not shown) may nest to clamp the collar against the bearing flange rim 82. The collar 81 then joins the base 45 by an angularly disposed neck 86 flaring radially inwardly and axially outwardly from the base 45.

As may be viewed in FIGS. 3 and 5, the bull gear 13 has a cylindrical shaft-like hub surface 32 projecting through the gear case cutout or passage 31 toward the motor side. The annular sealing device 43 is interposed between the hub surface 32 and the gear case cutout 31 (as is the sealing device 42 between the cutout 35 and the wheel hub 33). In FIG. 6, it will be noted that the motor side sealing element 43 also has its I.D. surface 64 spaced away from the shaft hub 32 as at 65 so as not to rub thereon. Likewise, the projections 66 are for the most part spaced from the hub surface as indicated at 62.

Thus it will be evident from FIGS. 5 and 10 that there is preferably no contact (or very minimal contact with the spacer projections 66) between the respective sealing devices 42 and 43 and their related hub surfaces 32 and 33 within the confines of the gear case.

Previous concepts employed a felt or elastomer seal which engaged the wheel-hub 33 and the gear hub 32 generally in line with the vertical sides of the gear case or offset toward the inside of the case. With lateral movement of the gear case relative to the gear and hubs the rubbing seals would act like a scraper or "windshield" wiper and pump gear lubricants collecting on the hubs to the outside of the case resulting in high losses. Moreover, the rubbing seals would generate heat in the gear hubs which was then transmitted to the lubricant thereby decreasing its viscosity and resulting in even higher losses.

Now, for installation, the sealing devices 42 and 43, which may be pliant and bendable, are placed around their respective hubs 32 and 33. Initially, for example, the wheel side device with its split ends unlatched and spread apart is threaded, with one leading, between the gear 13 and the wheel 15. The clasp 75 is then closed thereby clamping the sealing element around the wheel hub 33 with only the lip 63 primarily contacting the hub surface. Preferably the split-line is placed at the 6:00 o'clock position although it may be located at other positions if it is found more desirable.

In similar manner, the motor side sealing element 43 is unlatched and fed around the gear hub 32 and between the gear 13 and the motor frame (not shown). Its clasp 75 is then closed to bring the split ends 68 and 69 together, again preferably at the 6:00 o'clock position. A steel clamp (not shown) in the nature of a hose clamp may be clamped in the collar recess 84 (FIG. 6) to secure the collar against the support bearing flange rim 82.

As shown in FIG. 6, the motor side sealing device 43 has an overflow drain slot 87 positioned generally at the 6:00 o'clock position. The slot 87 preferably extends on both sides of the split-line 44. The drain 87 extends in a somewhat vertical direction to provide a communication passage between an area adjacent the gear hub shaft surface 32 from the inside of the case to the outside of the case along the outer sealing element leg 47. In other words, the drain extends between the collar 81 and the outside leg 47. This serves the purpose of an overflow in the event of excess lubricant in the gear case.

With both sealing elements 42 and 43 latched in position around their respective shaft-like hubs 32 and 33, the top half of the gear case 11 and bottom half 12 are mated together with their respective side cutouts 31 and 35 nesting in the sealing element slots 46 (See FIG. 3). The effective diameter of the bottom 91 (FIGS. 6 and 11) of the slots is slightly greater than the diameter of the cutouts 31 and 35 so that the gear case sides exert a compressive action on the sealing elements to further force the split ends 68 and 69 into compression contact with one another. Actually, the sealing devices are made with a slightly larger diameter (with the exception of the lip 63 and collar 81) so that an effective crush will be exerted at the split-line when the gear cases are mated. The gear case halves 11 and 12 are then bolted together through the brackets 19 which straddle traction motor mounting lugs or arms not shown.

As the side sheets 20 and 21 of the gear case along the cutouts 31 and 35 engage the bottom 91 of the sealing element slots 46, if there is any excess deflection of the sealing device base 45 toward a hub surface 32 or 33, one or more of the spacers or projections 66 will engage the associated hub in a very localized area. This action helps to either center the gear case relative to the hub or provide a bottoming stop to drive or force the sealing bottom 91 of the slot radially outwardly to cause it to seat against a gear case cutout 31 or 35. During running, the spacers 66 which provide tangential type contact will abrade to provide minimal or no contact with the hub surfaces.

When the sealing elements 42 and 43 are concentric with respect to the hubs, the spacers 62 have a desirable clearance of approximately $\frac{1}{8}''$ away from the hub surfaces 32 and 33 so as not to provide a scraping action of any gear lubricant collecting on the surfaces. It has been found that gear lubricants which collect on the hub surface will spin off in a generally vertical plane under centrifugal forces during rotation of the gear. However, if the surfaces are being wiped clean by the rubbing action of a contact type seal, the gear lubricant keeps replenishing itself as the hub surfaces and is then pumped or wiped by the rubbing seal. It is for this reason that the water and dirt lip seal 63 preferably contacts the wheel hub 33 to the outside of a vertical projection of the side 21 (See FIG. 3).

In operation, as the bull gear 13 rotates, lubricant 92 (FIG. 3) in the bottom of the case is carried upwardly by the gear and is sprayed against the top wall 22 of the case. As shown by the arrows 93, the lubricant is then deflected downwardly along the gear rim sides 59 and the case sides 20 and 21. Lubricant traveling along the sides in the general direction of the arrows 93 is then collected in the sealing element trough or channel 49. It then flows downwardly following the arcuate shape of the trough 49 and drains as by the arrows 94 at the bottom to the reservoir area 92 of the case.

As noted hereinbefore and as shown in FIG. 3, the sealing device troughs 49 extend axially inwardly to project under the side edges 59 of the gear rim. Any dripping directly down from the rim side, particularly at slower speeds or immediately after stopping, is then caught by the troughs. Lubricant splatter which gathers on the inner wall 54 or I. D. of the trough can also drain to the lowermost point of the sealing elements because of the truncated taper or pitch of the inner wall. As will be seen in the lower portion of FIG. 3; lubricant will drain off of the elements inner wall 54 as shown by the arrows "X".

While running, because of centrifugal forces, gear lubricant which may collect near the hubs 32 and 33 is generally spun outwardly along the gear web 58 as indicated by the arrow "Y" and recirculated downwardly along the sides of the case to the trough with the flow 93.

From the foregoing, it will be seen that the sealing elements 42 and 43 overhang and protect the gear hub 32 and wheel hub 33 shaft-like areas projecting through the side cutouts in the gear case. Moreover, since the sealing elements extend over a 360° circular area, they also act as a baffle to deflect lubricant spray coming from the meshing action of the pinion gear 16 and bull gear 13 in the vicinity of the arrows "W" (FIG. 1).

While the sealing elements have been shown to be circular with a single split-line 44, they of course can be made somewhat semicircular or less than 180° and be used as two (or more) pieces. In some cases, it may not be possible to provide a full 360° coverage by the sealing elements, but it is generally desirable that they extend below the projection of the pinion gear spray pattern "W" to deflect lubricant splash or splatter directed toward the hub surfaces. Also, while the gear and wheel hubs have been shown and referred to as shaft areas, there may be other members or devices associated with the gear case and/or gearing includable in this terminology. Likewise, while the wheel hub, gear hub and axle are different components, they do, of course, have association with one another in the gear case assembly.

Preferably, as discussed above, it is desirable that the sealing elements provide as little contact as possible with the rotatable hubs within the confines or projections of the gear case since it has been found that gear lubricants collecting on the hub areas do not have a great tendency to run laterally under reasonable film thickness and will spin off tangentially under rotation of the hubs. However, if a rubbing or scraping action is applied to the hubs, such as a rubbing seal, lubricant films which collect thereon are, in effect, pumped laterally or axially outwardly of the case under the lateral movement of the traction motor and/or axle. This is why the water and dirt exclusionary lip 63 of the wheel side sealing device 42 is located toward the outside of the gear case sides 21 and preferably no sealing contact is made on the gear hub 32.

What we claim is:

1. A lubricant retaining device for a gear case having a series of sides adapted to contain a lubricant, said case including matable members having edges which abut one another along a split-line to provide an enclosure, said case members having a complimentary pair of side walls with aligned oppositely facing recesses along adjacent edges which form a shaft receiving opening when said sections are assembled together, said case being adapted to enclose at least a pair of interacting gears which give off a lubricant spray pattern when rotating, and wherein a gear in said case has a rim with a tooth area along the periphery thereof and an arm relatively thinner than said rim extending radially inwardly from said rim to provide an undercut area under said tooth area, and wherein a shaft surface extends through said opening and is rotatable with one of said gears with a spray pattern from said gears being directed toward said shaft surface, said device comprising, section means adapted to extend inwardly from a point adjacent a side of said case and in overhanging relation with respect to at least a portion of said shaft surface as the latter extends through said opening to the interior of said case, said section means being positioned between said shaft surface and said gear tooth area to extend on both sides of said split-line between said gear case members and beyond the lubricant spray pattern from said gears toward shaft surface to deflect lubricant spray directed toward said shaft surface, said device being split to provide ends and having means provided on said section means to the interior of said case for urging said ends toward one another, and means carried by said device for locating said section means relative to said case.

2. A lubricant retaining device for a gear case having a series of sides adapted to contain a lubricant, said case including matable members having edges which abut one another along a split-line to provide an enclosure, said case members having a complimentary pair of side walls with aligned oppositely facing recesses along adjacent edges which form a shaft receiving opening when said sections are assembled together, said case being adapted to enclose at least a pair of interacting gears which give off a lubricant spray pattern when rotating, and wherein a gear in said case has a rim with a tooth area along the periphery thereof and an arm relatively thinner than said rim extending radially inwardly from said rim to provide an undercut area under said tooth area, and wherein a shaft surface extends through said opening and is rotatable with one of said gears with a spray pattern from said gears being directed toward said shaft surface, said device comprising, section means adapted to extend inwardly from a point adjacent a side of said case and in overhanging relation with respect to at least a portion of said shaft surface as the latter extends through said opening to the interior of said case, said section means being positioned between said shaft surface and said gear tooth area to extend on both sides of said split-line between said gear case members and beyond the lubricant spray pattern from said gears toward shaft surface to deflect lubricant spray directed toward said shaft surface, said section means having an axially extending wall overhanging and facing said shaft area, said wall tapering radially outwardly to a larger diameter in the nature of a truncated cone as it projects inwardly from a point adjacent a side of said case to permit lubricant to drain therefrom, and means carried by said device for locating said section means relative to said case, 3. A lubricant retaining device for a gear case having a series of sides adapted to contain a lubricant and wherein a gear in said case has a rim with a tooth area along the periphery thereof and said gear has an arm relatively thinner than said rim extending radially inwardly from said rim to provide an undercut area under said tooth area, said case having an opening in a side thereof with a shaft area extending into proximity to said opening so as to be in association with said gear, said device comprising, a section adapted to extend inwardly from a point adjacent a side of said case and in overhanging relation with respect to at least a portion of said shaft area as the latter extends through said opening to the interior of said case, said section providing an overhanging area to shield said shaft area from lubricant in said case, said device having means for cooperating with said case to place areas of said device under compression when installed in said case, and means carried by said device for locating said device relative to a side of said case.

4. A lubricant retaining device for a gear case having a series of sides adapted to contain a lubricant and wherein a gear in said case has a rim with a tooth area along the periphery thereof and said gear has an arm relatively thinner than said rim extending radially inwardly from said rim to provide an undercut area under said tooth area, said case having an opening in a side thereof with a shaft area extending into proximity to said opening so as to be in association with said gear, said device comprising, a section adapted to extend inwardly from a point adjacent a side of said case and in overhanging relation with respect to at least a portion of said shaft area as the latter extends through said opening to the interior of said case, said section providing an overhanging area to shield said shaft area from lubricant in said case, said device having a spacer which overlies a portion of the shaft area, and means carried by said device for locating said section relative to a side of said case.

5. A device as claimed in claim 4 wherein said section includes a number of spacers arcuately separated from one another.

6. A device as claimed in claim 4 wherein said spacer is somewhat in line with the plane of a side of said case and said opening therein.

7. A lubricant retaining device for a gear case having a series of sides adapted to contain a lubricant and wherein a gear in said case has a rim with a tooth area along the periphery thereof and said gear has an arm relatively thinner than said rim extending radially inwardly from said rim to provide an undercut area under said tooth area, said case having an opening in a side thereof with a shaft area extending into proximity to said opening so as to be in association with said gear, said device comprising, a section adapted to extend inwardly from a point adjacent a side of said case and in overhanging relation with respect to at least a portion of said shaft area as the latter extends through said opening to the interior of said case, said section providing an overhanging area to shield said shaft area from lubricant in said case, said device having a sealing means extending generally to the outside of said case and including a collar portion for engaging a static member, and having a drain extending through said device in proximity to said collar and generally parallel to a side of said case so as to provide a passageway between the inside and the outside of said case, and means carried by said device for locating said device relative to a side of said case.

8. A lubricant retaining device for a gear case having a series of sides adapted to contain a lubricant and wherein a gear in said case has a rim with a tooth area along the periphery thereof and said gear has an arm relatively thinner than said rim extending radially inwardly from said rim to provide an undercut area under said tooth area, said case having an opening in a side thereof with a shaft area extending into proximity to said opening so as to be in association with said gear, said device comprising, a section adapted to extend inwardly from a point adjacent a side of said case and in overhanging relation with respect to at least a portion of said shaft area as the latter extends through said opening to the interior of said case, said section providing an overhanging area to shield said shaft area from lubricant in said case, said device having a drain extending therethrough so as to communicate between an area toward the inside of said case and the outside of said case, means carried by said device for locating said device relative to a side of said case.

9. A device for a traction motor gear case wherein the case has a series of walls adapted to contain a lubricant and wherein a gear in said case is mounted on an axle and a wheel is also mounted on said axle and is spaced from said gear, with said gear having a rim with a tooth area along the periphery thereof and an arm relatively thinner area than said rim extending radially inwardly from said rim to provide an undercut area under said tooth area, and wherein said case includes a plurality of sections having edges which abut one another at a split-line to provide an enclosure about said gear, said sections having a complimentary pair of side walls with aligned oppositely facing recesses along adjacent edges which form an opening when said sections are assembled together, and wherein a shaft surface extends into said opening and is rotatable with said gear, said device comprising, an arcuately extending base having an inner surface adapted to be radially spaced from said shaft surface, said base having an arcuately extending slot therein opening radially outwardly away from said shaft surface into which a recess area carried by a side wall of said case can nest, said base being interposed between said shaft surface and said recess area and being generally exposed to said shaft surface but being spaced therefrom.

an arcuately extending web projecting axially inwardly from said base toward the inside of said case, said web being spaced radially outwardly from said shaft surface and extending in an axial direction relative to said shaft surface so as to extend toward said gear arm and under the projection of said rim of said gear and having a wall facing said shaft surface with at least a portion of said wall tapering radially away from said shaft surface as said web extends toward said rim to allow lubricant to drain therefrom.

said base and said web being pliant and including a pair of ends which may be spread to enable said device to be inserted in overhanging relation with respect to said shaft surface without removing said gear or said wheel from said axle.

10. A device as claimed in claim 9 wherein at least one of said ends of said device is adapted to be positioned and adjacent another end and said device extends on at least both sides of said split-line of said gear case.

11. A device as claimed in claim 9 wherein said device has said web extending to the inside of said gear case and has an arcuate sealing collar extending outwardly of said gear case from said base which is adapted to seal against a support bearing carried by a traction motor associated with said gear case.

12. A device as claimed in claim 9 wherein said device has an arcuately extending sealing lip extending from said base toward the outside of said gear case and said web extends to the inside of said case.

* * * * *